United States Patent [19]

Kitagawa

[11] 3,909,631

[45] Sept. 30, 1975

[54] PRE-CHARGE VOLTAGE GENERATING SYSTEM

[75] Inventor: Norishisa Kitagawa, Houston, Tex.

[73] Assignee: Texas Instruments Incorporated, Dallas, Tex.

[22] Filed: Aug. 2, 1973

[21] Appl. No.: 385,203

[52] U.S. Cl. ................ 307/238; 307/246; 307/279; 340/173 DR

[51] Int. Cl.[2] ...................... G11C 11/24; G11C 7/02

[58] Field of Search ........... 307/268, 269, 246, 247, 307/279; 328/62, 63; 340/173 DR

[56] References Cited

UNITED STATES PATENTS 3,555,307 1/1971 Hujita ................................ 307/279

3,636,530 1/1972 Mark et al. ..................... 307/279 X

*Primary Examiner*—John Zazworsky

*Attorney, Agent, or Firm*—Harold Levine; Edward J. Connors, Jr.; John G. Graham

[57] ABSTRACT

The disclosure relates to a precharge voltage generator for use in an MOS memory matrix device wherein a voltage is generated which is midway between the voltage stored designating a logical 1 and a logical 0. This voltage is constantly variable to track changes in $V_{DD}$ and $V_T$ during circuit operation to provide the desired midvoltage level and thereby allow accurate recognition of logic levels.

5 Claims, 7 Drawing Figures

PRE-CHARGE VOLTAGE GENERATING SYSTEM

This invention relates to a high density, high speed random access read-write memory and, more specifically, to such a device which is capable of providing random access to a large number of bit storage, i.e., 4096 bit storage cells.

Random access storage devices which utilize a single MOS chip have been known in the art. The number of storage cells capable of being placed on a single MOS chip has been limited by the ability to pack components closer together or reduce component sizes as well as by operation speed considerations. Many of the known random access storage devices utilizing a single chip require a three transistor storage cell, these being difficult to process as well as consuming a relatively large amount of spacc. These devices also present timing problems within the chip and therefore require plural clocks. Exemplary of a prior art memory array using one-transistor cells and a sense and refresh amplifier similar to the system described herein is Stein et al. U.S. Pat. No. 3,774,176.

In accordance with the present invention, there is providcd a high speed, high density RAM which is capable of having more bit storage cells than any known commercial RAMS, which has higher speed than known very high density RAMs and which has high yield due to design thereof.

Briefly, the above is accomplished by providing an MOS chip having a single external clock input which, internally of the chip, generates other timing signals, some of which are responsive to the receipt of all address bits of the address to delay the beginning of certain timing cycles until all information is received, thereby preventing error, yet commencing operation as soon as all address data is received to improve chip speed of operation. The RAM includes a basic storage cell which is composed of one transistor and one capacitor, thereby providing smaller cells and greater cell density as well as increasing chip speed due to decrease in stray capacitances. The circuit also includes a sense amplifier associated with each row of a storage matrix to provide refreshing of data, transfer of data in or out as well as operation in conjunction with dummy cells and a precharge voltage generator to precharge the sense amplifier to predetermined levels to allow accurate comparison with stored data or data to be written in and provide accurate results. The circuit also includes an input buffer circuit which connects the source of the driver to the input to permit the use of a small driver transistor while still accurately operating with TTL devices as well as other devices. This reduction in driver size permits greater component packing density as well as increased speed due to capacitance reduction. The input buffer also has provision for power conservation when reading out a "0" at one of its outputs by isolating the output from the power source and coupling the output to ground.

It is therefore an object of this invention to provide an MOS random access memory having relatively very high component density and high speed of operation.

It is a still further object of this invention to provide an MOS RAM utilizing a sense amplifier for refresh as well as read and write functions which is precharged to a predetermined voltage level which can be varied based upon supply voltage ($V_{DD}$) and threshold voltage ($V_T$) to provide accurate data sensing.

The above objects and still further objects of the invention will become immediately apparent to those skilled in the art after consideration of the following preferred embodiment thereof, which is provided by way of example and not by way of limitation, wherein.

Figure 1:
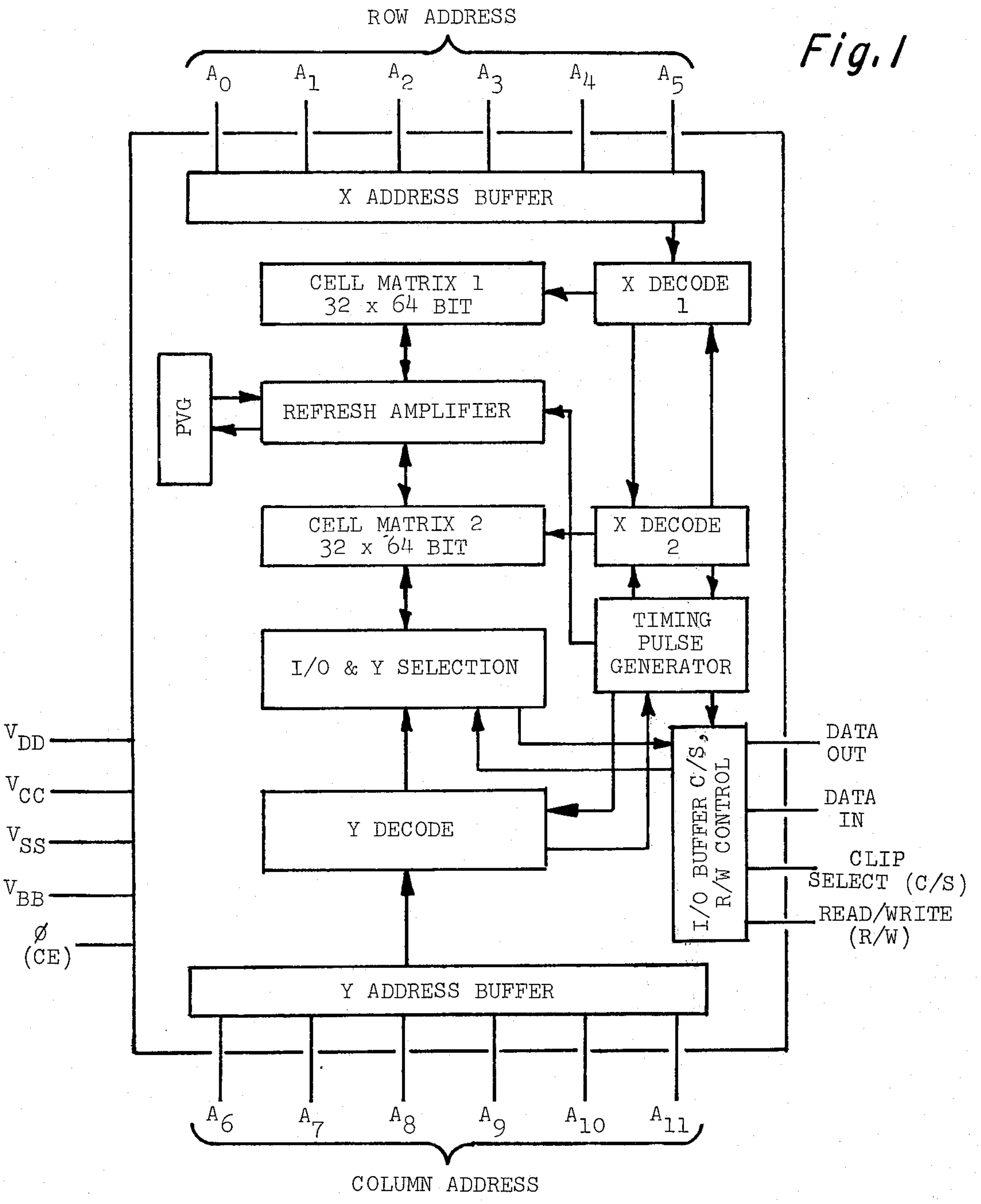
FIG. 1 is a block diagram of the MOS chip of the present invention with circuits formed therein.

Referring first to FIG. 1, there is shown a schematic diagram of a high density, high speed random access read-write memory in accordance with the present invention. In the preferred embodiment, the memory is described in the form of a single n-channel MOS chip, it being understood that other embodiments utilizing the inventions disclosed herein, such as p-channel, are also included with appropriate circuit changes as are well known to those skilled in the art. The chip includes twenty-one leads, these including six row address inputs ($A_0$ to $A_5$), six column address inputs ($A_6$ to $A_{11}$), external voltage inputs $V_{DD}$, $V_{CC}$, $V_{SS}$, and $V_{BB}$ and external clock input $\phi$ or CE, a data output lead, a data input lead, a chip select (C/S) lead which can be used as an additional address signal and indicates whether this particular chip of a multi-chip array has been selected and a read/write (R/W) lead which indicates whether data is to be written in at thc selected address or read out from the selected address.

The chip includes a memory matrix which is composed of cell matrix 1 and cell matrix 2, each cell matrix having thirty-two rows and sixty-four columns of cells to provide a 4096 cell memory matrix, it being understood that the number of cells can be increased or decreased with appropriate circuit and/or design changes as is known to those skilled in the art. A particular cell in the memory matrix is selected for read out when a read signal is on the read/write line by providing a six bit row address and a six bit column address, the row address being fed to an X address buffer which converts the input signal from TTL level to MOS level. The output of the buffer is fed to an X decoder which is composed of X decoder 1 for cell matrix 1 and X decoder 2 for cell matrix 2. The X decoder converts the output of the buffer to a one out of sixty-four output which, via a driver, energizes the selected row in the cell matrix. The selected row is read out to a refresh amplifier and also to an input/output (I/O) and Y selection circuit. The refresh function is well known and is nothing more than a rejuvenation of the outputs of the cells of the selected row prior to restoring the signals in the cells from which they came. Of this row of data signals, one signal is selected by means of the column or Y address buffer and Y decode circuit. The Y address buffer is substantially the same as the X address buffer, the output of this buffer controlling the Y decode circuit which is a gating circuit which allows only the data from the cell in the selected column to be read out to the input/output (I/O) buffer from which the data is read out on the DATA OUT lead. The timing of the circuit operations within the chip is controlled by a single external clock which provides pulses at the clock input $\phi$ (CE) to the chip. Other timing pulses are developed within the chip by the timing pulse generator, under control of the external clock. The PVG is a precharge voltage generator and provides the function of precharging circuitry on the chip (to be explained later hereinbelow) to provide an accurate reference for determination as to whether a 1 or 0 is being sensed.

In the event data is to be written into the cell matrix, the read/write line will have a write signal thereon and data will be fed to the chip along the DATA IN line. The addressing will now operate in substantially the reverse order of that described above for the read function. The incoming bit signal will be fed via the I/O buffer to the I/O and Y selection circuit wherein the bit signal will be allowed to pass to the sense amplifier (to be described in detail hereinbelow) associated with the selected column only. This data signal will then be applied to all cells of the selected column, the cell in which said data signal is stored being determined by the particular row selected by the X decoder under control of the row address and X address buffer.

Figure 2:
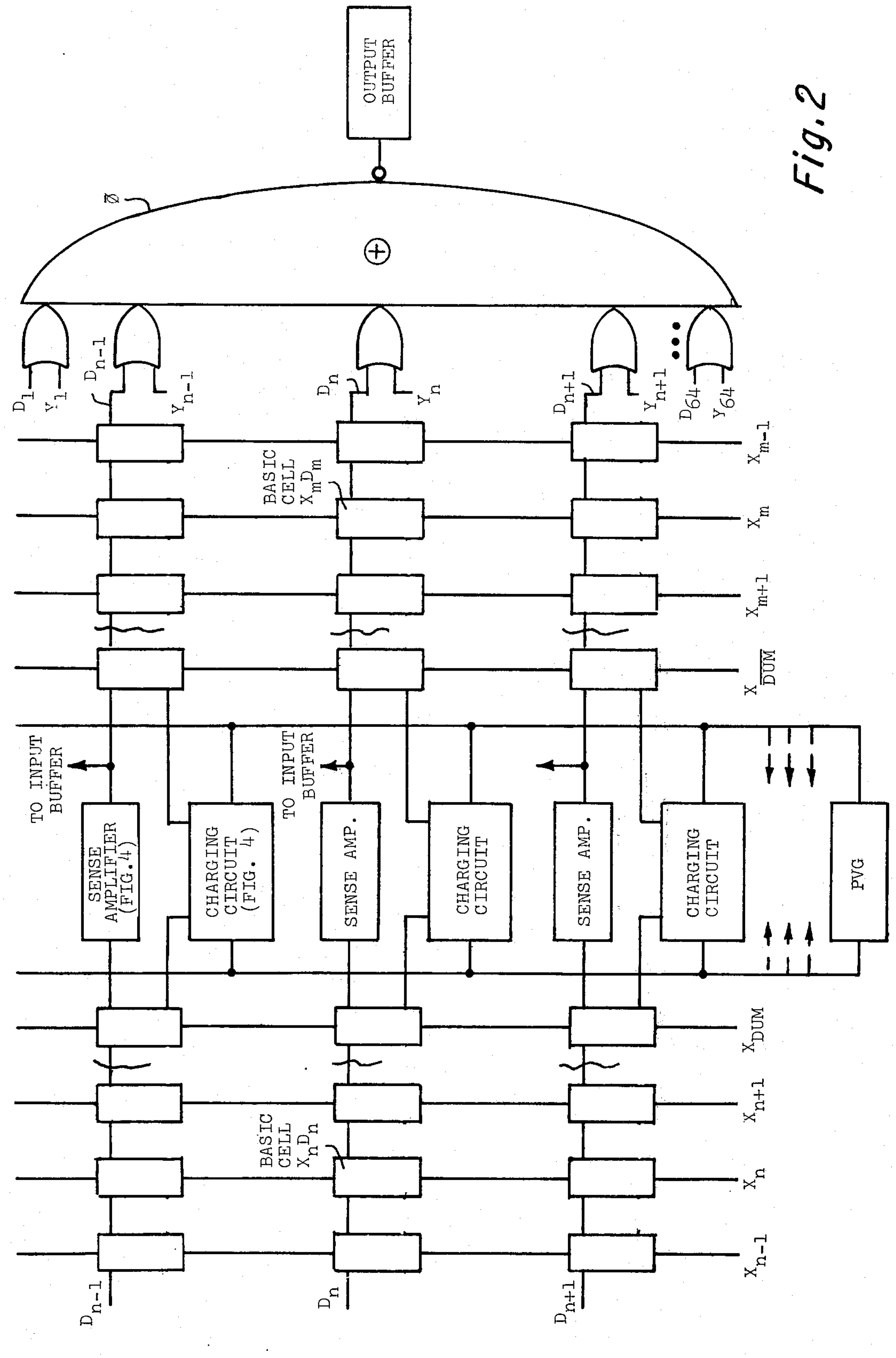
FIG. 2 is a block diagram of the cell matrix, refresh amplifier, I/O and Y selection and PVG.

Referring now to FIG. 2, there is shown a typical cell matrix composed of plural basic memory cells, one at the junction of each X line and each D line. The basic memory cells to the left of the sense amplifier in FIG. 2 would correspond to cell matrix 1 of FIG. 1 and the basic memory cells to the right of the sense amplifiers in FIG. 2 would correspond to cell matrix 2 of FIG. 1. The sense amplifiers and charging circuits (noted as FIG. 4) in FIG. 2 correspond to the refresh amplifier of FIG. 1. The gating circuits composed of AND gates, each coupled to one lead of a one out of sixty-four Y address from the Y decoder and one of the D lines or column lines, all said AND gates coupled to an OR gate, corresponds to the I/O and Y selection circuit of FIG. 1. The circuitry is designed whereby the six bit row address signal (FIG. 1) results in the X decoder selecting one of the X lines in the memory matrix. If an X line to the left of the sense amplifiers of FIG. 2 is selected, the line $X_{\overline{DUM}}$ will also be selected. As will be explained in detail hereinbelow, selection of an X address provides read out of all memory cells along the selected row via the sense amplifier with refreshing. However, the only cell actually read out by the logic is determined by the six bit column address and Y decoder (FIG. 1) which enables only one of the AND gates of FIG. 2.

Figure 3:
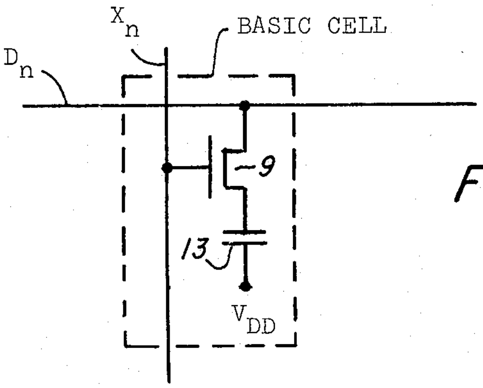
FIG. 3 is a circuit diagram of a basic storage cell in accordance with the present invention.

The basic cell is shown in detail in FIG. 3 where the cell at the matrix junction $X_nD_n$ is set forth. It can be seen that the enablement of the row line $X_n$ turns on the transistor 9 and permits the charge stored on the capacitor 13 to be applied to the column line $D_n$. The voltage of the capacitor 13 is either about zero (ground) to denote one storage condition, or some higher voltage to denote the opposite storage condition. The line $V_{DD}$ is a positive source of potential. Actually, the capacitance is obtained from a pair of capacitors, one as shown by capacitor 13 and a second capacitor connected between ground and the terminal of capacitor 13 remote from line $V_{DD}$.

Figure 4:
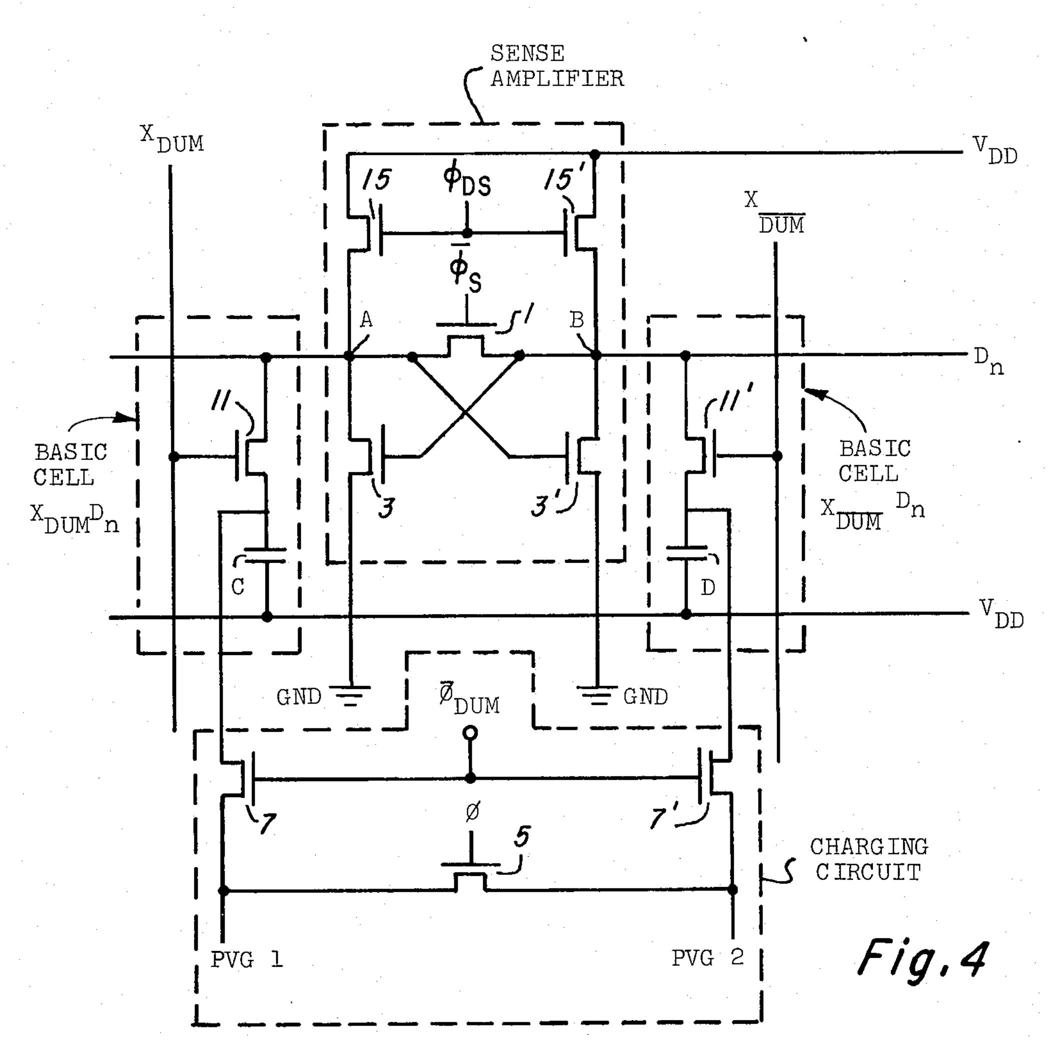
FIG. 4 is a circuit diagram of a sense amplifier with associated dummy cells and charging circuit.

FIG. 4 sets forth in detail a typical set of dummy cells $X_{DUM}D_n$ and $X_{\overline{DUM}}D_n$ coupled to a sense amplifier with a charging circuit identified in FIG. 2 as "FIG. 4." There is one sense amplifier and one charging circuit in each column. The precharge voltage generator (PVG) shown in FIGS. 1 and 1 applies a $V_{DD}$ and $V_T$ tracking voltage to the dummy storage cells. The PVG circuit will be described in detail hereinbelow with respect to FIG. 7.

Figure 5:
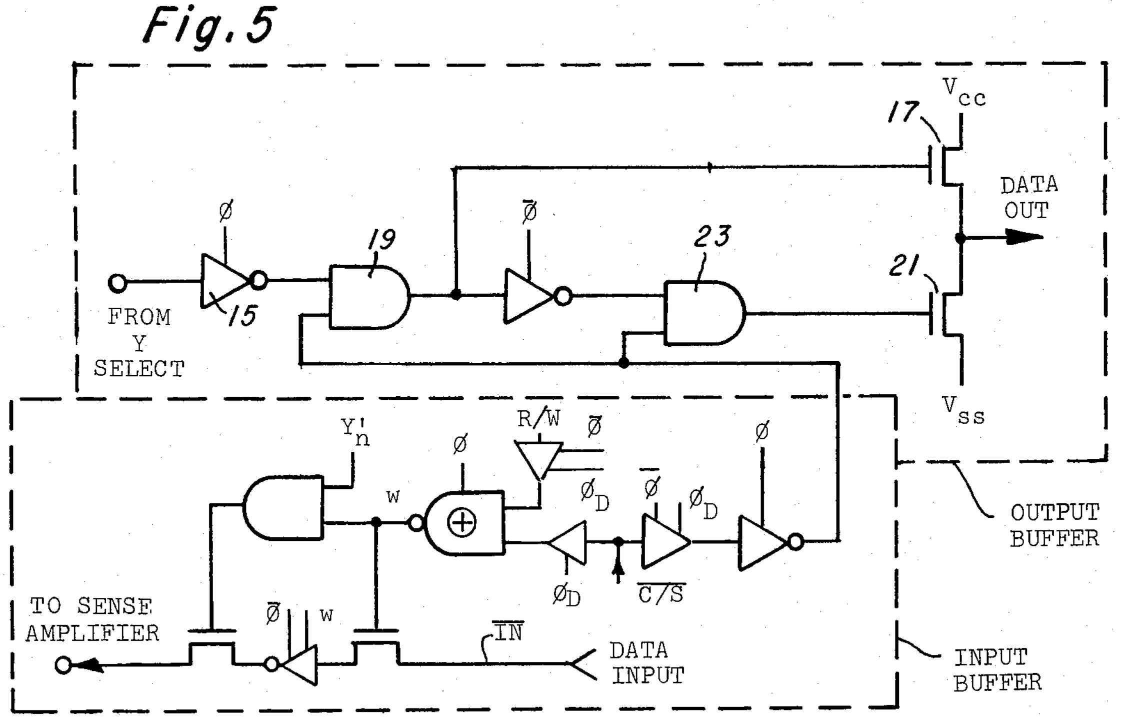
FIG. 5 is a logic diagram of the I/O buffer.

FIG. 5 is a logic diagram of the box in FIG. 2 labeled output buffer as well as the input buffer which is coupled to the sense amplifier as shown in FIG. 2.

Figure 6:
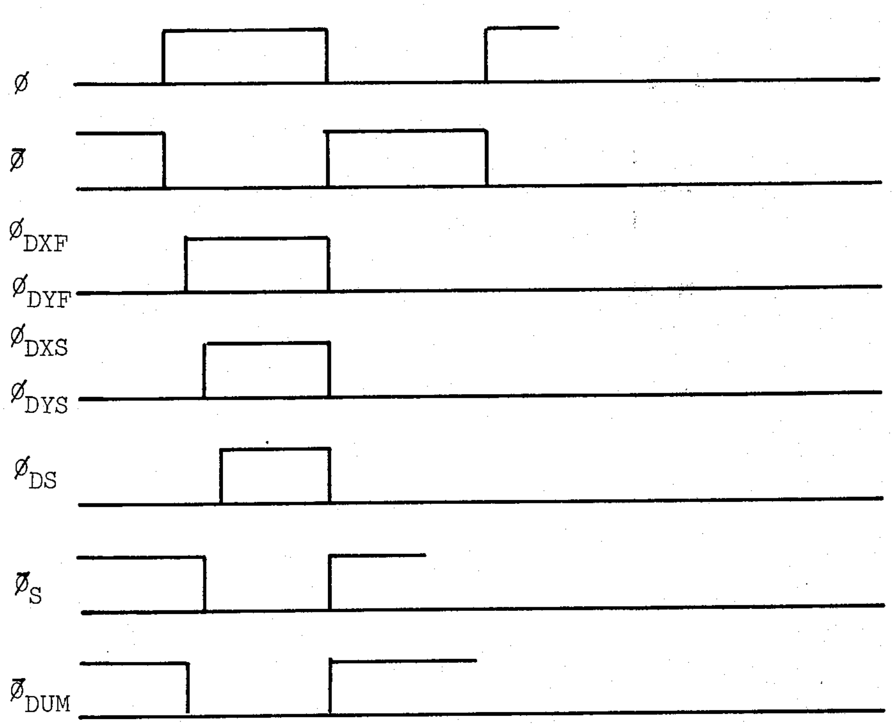
FIG. 6 is a timing diagram of the timing signals produced in the chip from the external signal $\phi$.

FIG. 6 sets forth the time relation of the various timing signals present on the chip. The timing signals $\phi$ is introduced externally of the chip as noted earlier, $\overline{\phi}$ being, the logical zero of $\phi$, being generated internally. The remaining timing signals are generated within the chip itself from the $\phi$ signal as will be set forth in detail hereinbelow.

Referring now to FIGS. 2 to 6, the read out function will be described in detail. If we assume that the data stored in basic cell $X_nD_n$ of FIG. 2 is to be read out, this is accomplished by providing the necessary row address input to define the address of the row line $X_n$. Also, the column address input will define the address $Y_n$. In addition, as noted supra, when an X address to the left of the sense amplifier in FIG. 2 is selected the line $X_{\overline{DUM}}$ is also selected.

The initial operations take place during $\overline{\phi}$ and $\overline{\phi}_s$ time. During the $\overline{\phi}$ time period, the PVG generates the high voltage previously described at lead PVG 1 (FIG. 4) and ground voltage at lead PVG 2. Since the sense amplifier (FIG. 4) operates as a flip flop, one of the nodes A and B is initially of high voltage (above $V_T$). When $\overline{\phi}_s$ is on, $\phi_{DS}$ is off (FIG. 6) so nodes A and B (FIG. 4) are equalized in voltage through transistor 1. If we assume that the voltage at node A is high relative to node B, node B charges up through low conducting transistor 1 to equalize the voltage of nodes A and B and then turns on transistor 3 to allow node A to discharge toward $V_T$.

Referring again to FIG. 4, during $\phi$ time, transistor 5 is turned on and thereby equalizes the voltage at the PVG 1 and PVG 2 inputs to $(V_{DD} - 2V_T)/2$. Therefore, during $T_{DUM}$ time, transistors 7 and 7' conduct and charge the capacitors C and D in the dummy cells to the voltage $(V_{DD} - 2V_T)/2$. The voltage $(V_{DD} - 2V_T)/2$ is selected to be about midway between the 1 and the 0 voltage stored in a basic cell and acts as a $V_{DD}$ and $V_T$ tracking reference to allow more accurate determination of a stored 1 or 0.

After the system has been set up as described above, the line $X_n$ (FIG. 2) will be energized and turn on transistor 9 (FIG. 3). The charge on the capacitor 13 of the cell will be applied to the line $D_n$ and is therefore applied to node A of the sense amplifier (FIG. 4). Selection of line $X_n$ also causes selection of line $X_{\overline{DUM}}$ and, accordingly, the charge on the capacitor D (FIG. 4) will be applied to node B via transistor 11. As described supra, the nodes A and B of the sense amplifier were initially in the balanced state. Therefore, the voltage now applied to node B via capacitor 11 is midway between a 1 and 0 so the sense amplifier can easily determine whether the voltage at node A represents a 1 or a 0 and the flip flop will conduct accordingly. If node A is above the node B voltage, transistor 3' will conduct and a ground potential will be applied to node B. This is accomplished during $\phi_{DS}$ time when transistors 15 and 15' are conducting to apply $V_{DD}$ to the nodes A and B. Alternatively, if a ground voltage is applied to node A, node B would have charged up to above $V_T$ and turned on transistor 3, thereby applying a ground potential to node A.

At the end of $\phi_{DS}$ time, assuming a 1 was read out of cell $X_nD_n$, node A (FIG. 4) is charged to about $V_T$ below $V_{DD}$ voltage and node B is at ground potential. The voltage on node A is at this time applied to capacitor 13 of the cell $X_nD_n$. Also, the information read out from all other cells along the row $X_n$ has undergone the same operations discussed above. Therefore, when the signal is removed from $X_n$, the cells along the row $X_n$ have been refreshed.

Also, at the end of $\phi_{DS}$ time, the opposite of the signal stored in basic cell $X_nD_n$ is applied to node B (FIG. 4). Node B, as seen from FIG. 2, is applied to an AND gate having inputs $D_n$ and $Y_n$. All of the remaining columns are coupled to AND gates in the same manner. Only one of these AND gates will be enabled, this being determined by the Y address, as noted previously. Assuming $Y_n$ was selected, the data bit is read out through the OR gate of the selection circuit to the output buffer which is set forth in detail in FIG. 5.

The output buffer (FIG. 5) includes a gate which is open during $\phi$ time and passes the output of the selection circuit to an AND gate 19 which is enabled when (1) the chip has been selected (C/S), (2) a $\phi$ chip enable signal is provided. The output of gate 19 makes transistor 17 conduct when transistor 21 is also caused to conduct via AND gate 23 when the $\overline{\phi}$ signal is not present. Because the output signals of gates 19 and 23 are opposite, only one of the output push-pull devices 17 and 21 will conduct, depending upon the output of the sense amplifier to the output buffer circuit. This provides the output signal at the DATA OUT pin of the chip. When one or both the signals C/S and $\phi$ (CE) are off, device 17 and 21 turn off and the data output terminal is isolated or in a high impedance state.

When the data to be read out is located in a basic cell to the right of the sense amplifiers in FIG. 2, as, for example, basic cell $X_mD_n$, the operation is altered slightly as follows. When the address line $X_m$ is addressed, the line $X_{DUM}$ is also addressed. This will mean that the signal stored in the capacitor 13 of the cell $X_mD_n$ will appear at node B (FIG. 4) which is the portion of line $D_n$ to the right of the sense amplifier. Node A is charged to a voltage between a 1 and 0 as previously described.

It can be seen that, since the sense amplifiers operate as flip flops, signals read out of cells to the left of the sense amplifiers, if high at node A, are low at node B and vice versa. This is also true for cells to the right of the sense amplifiers. Therefore, a high voltage (or low voltage, as the case may be) in a cell to the left of the sense amplifiers appears at the gate circuits as a low voltage whereas a high voltage in a cell to the right of the sense amplifiers appears at the gate circuits as a high voltage. It is therefore apparent that a stored logical 1 to the left of the sense amplifiers is of opposite voltage to a stored logical 1 to the right of the sense amplifiers.

In order to provide a write function of information into a cell to the left of the sense amplifiers, such as cell $X_nD_n$, the chip select (C/S) signal for the chip is provided and with the proper read/write signal and $Y_n$ address as shown in FIG. 5, the signal on the data input line is passed via the input buffer to the right hand side of the sense amplifier at the point noted in FIG. 2 with the arrow "to input buffer." The sense amplifiers have otherwise at this time been precharged as stated above for the read out operation with nodes A and B (FIG. 4) at slightly below $V_T$. The input signal from the input buffer is applied to node B of the sense amplifier associated with line $D_n$, this being the output line from the input buffer which has been selected by the Y address. The lines from the input buffer (not shown) which are associated with the remaining sense amplifiers are not carrying signals since the address associated therewith has not been selected. Since the sense amplifiers operate as flip flops, if we assume a high voltage was impressed at node B, transistor 3 will conduct and bring node A to ground potential. During this operation, X address line $X_n$ has been energized, thereby allowing the capacitor 13 of cell $X_nD_n$ to be charged to the voltage of node A through transistor 9, this voltage being ground potential. When the signal on line $X_n$ is removed, the new input has been stored in cell $X_nD_n$. It is noted that during the write operation, since all cells along the row $X_n$ are addressed, the entire row $X_n$ is refreshed in the manner previously described except for the cell $X_nD_n$ wherein new data has been entered.

In the event the new data at the input is to be read into a cell to the right of the sense amplifier, such as cell $X_mD_n$, the operation would be the same as explained above, except that the signal impressed at node B would not be inverted by the sense amplifier prior to storage. It can therefore be seen that the voltage on the capacitor 13 which stores a 1 to the left of the sense amplifiers is the opposite of that which stores a 1 to the right of the sense amplifiers. This reversal of voltage level accommodates for the reversal discussed hereinabove for the read out operation.

Figure 7:
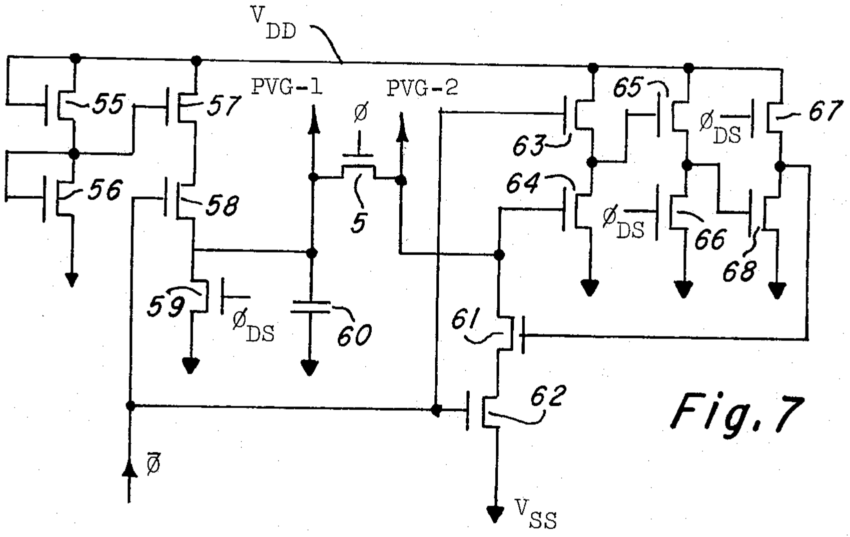
FIG. 7 is a circuit diagram of the precharge voltage generator (PVG)

Referring now to FIG. 7, there is shown a circuit diagram of the precharge voltage generator (PVG). This circuit provides an intermediate $V_T$, $V_{DD}$ tracking voltage at the sense amplifiers as discussed above via the inputs PVG 1 and PVG 2 as shown in FIG. 4. One PVG precharges all of the sense amplifiers as noted in FIG. 2 via the charging circuit. Transistors 55 and 56 conduct, but transistor 56 is of such high resistance that the voltage drop across transistor 55 is one threshold voltage $V_T$. Therefore, the voltage at the gate of transistor 57 is $V_{DD}-V_T$. Transistor 57 conducts and provides an additional voltage drop of $V_T$ so that the voltage at the source of transistor 57 is $V_{DD}-2V_T$. Transistor 58 provides the proper timing and allows the voltage at the source of transistor 57 to be impressed on the line PVG 1 in accordance with the input signal on the gate of transistor 58 and charging the capacitor 60. The transistor 58 is turned on at the end of a $\phi$ time and stays on until the beginning of the next $\phi$ time. Transistor 59 is turned on during $\phi_{DS}$ time to discharge capacitor 60 prior to a new recharging cycle in order to accurately control the output voltage of line PVG 1.

Line PVG 2 provides a zero voltage as follows. During $\phi_{DS}$ time, transistor 67 is turned on and thereby turns on transistor 61. At the end of the $\phi$ time period, transistor 62 is turned on and short circuits line PVG 2 to ground to provide the zero voltage level thereon. It can therefore be seen that at the beginning of each $\phi$ time period, a voltage of $V_{DD}-2V_T$ is provided at the line PVG 1 and a zero voltage is provided at line PVG 2. When $\phi$ time is on ($\overline{\phi}$ is off so transistor 62 is off), transistor 5 is turned on and equalizes the voltage at PVG 1 and PVG 2 to about $(V_{DD}/2) - V_T$. Since the stored voltage 1 at the cell is $(V_{DD} - V_T - \Delta V)$ and 0 is ground, the intermediate voltage to which the dummy cells should be charged is $(V_{DD}/2) - V_T + (V_T - \Delta V)/2$, which is about equal to the precharge voltage, where $(-\Delta V)$ is a time dependent voltage drop which is assumed to be about $V_T$ at operating conditions.

When $\overline{\phi}$ is high, transistor 63 is on, so $V_{DD}$ is applied through transistor 63 to the gate of transistor 65, turning on transistor 65. This applies $V_{DD}$ to the gate of transistor 68, turning it on, so the gate of transistor 61 is at $V_{SS}$; thus transistor 61 is off during $\overline{\phi}$. Transistor 66 is on during $\phi_{DS}$ which is applied to its gate, so during $\phi_{DS}$ the gate of transistor 68 will be connected to $V_{SS}$ and transistor 68 will be off, allowing $V_{DD}$ to be applied to charge the gate of transistor 61 through transistor 67, which is turned on by $\phi_{DS}$ . During $\phi$, PVG-2 will be at $(V_{DD}/2) - V_T$ as noted above, and this voltage appears on the gate of transistor 64, turning it on and turning off transistor 65 because the gate of transistor 65 is at $V_{SS}$.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A memory array having a precharge voltage generating system comprising, in combination:

a. first and second precharge voltage output terminals, b. means for providing first and second periodic timing signals synchronized with timing of access to the memory array, the first and second timing signals being displaced in phase from one another, c. a source of voltage and a source of reference potential, d. means responsive to said first timing signal for coupling the source of voltage to said first output terminal, e. means responsive to said first timing signal to couple the reference potential to said second terminals, and f. means responsive to the second timing signal to couple the first and second output terminals to one another whereby both such terminals then exhibit an output voltage substantially the average of the source of voltage and the reference potential.

2. A system as set forth in claim 1 further including a transistor and means responsive to the threshold voltage of said transistor for altering said source of voltage in relation thereto.

3. A system according to claim 2 wherein the source of voltage bears a fixed relation to a supply voltage for the memory array so that said output voltage is responsive to the value of the supply voltage and the value of the threshold voltage.

4. A system according to claim 1 wherein a third periodic timing signal is provided which occurs during the second timing signal but has a leading edge occurring a significant time after that of the second timing signal, and means are provided responsive to the third timing signal for discharging both of the output terminals.

5. A system according to claim 4 wherein the means responsive to the first, second and third timing signals are insulated gate field effect transistors.

* * * * *